(12) United States Patent
Maruyama et al.

(10) Patent No.: US 12,005,492 B2
(45) Date of Patent: Jun. 11, 2024

(54) VEHICLE SUPPORT STRUCTURE AND METHOD FOR MANUFACTURING VEHICLE SUPPORT STRUCTURE

(71) Applicant: HITACHI ASTEMO, LTD., Ibaraki (JP)

(72) Inventors: Yasuhiro Maruyama, Ibaraki (JP); Kazuhiro Terada, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/011,361

(22) PCT Filed: Jun. 1, 2021

(86) PCT No.: PCT/JP2021/020769
§ 371 (c)(1),
(2) Date: Dec. 19, 2022

(87) PCT Pub. No.: WO2022/054353
PCT Pub. Date: Mar. 17, 2022

(65) Prior Publication Data
US 2023/0226602 A1 Jul. 20, 2023

(30) Foreign Application Priority Data
Sep. 10, 2020 (JP) .................. 2020-152279

(51) Int. Cl.
*B22D 25/02* (2006.01)
*B22C 9/08* (2006.01)
*B22D 21/04* (2006.01)

(52) U.S. Cl.
CPC .............. *B22D 21/04* (2013.01); *B22C 9/082* (2013.01); *B22D 25/02* (2013.01)

(58) Field of Classification Search
CPC .......... B22D 21/04; B22D 25/02; B22C 9/082
See application file for complete search history.

(56) References Cited

U.S. PATENT DOCUMENTS
2016/0159392 A1 6/2016 Hoffmann

FOREIGN PATENT DOCUMENTS
JP  7-148547    6/1995
JP  2010-242821 10/2010
(Continued)

OTHER PUBLICATIONS

English machine translation of JP 2018203246 A (Year: 2018).*
International Search Report dated Aug. 17, 2021 in International Application No. PCT/JP2021/020769.

*Primary Examiner* — Kevin P Kerns
*Assistant Examiner* — Steven S Ha
(74) *Attorney, Agent, or Firm* — Wenderoth, Lind & Ponack, L.L.P.

(57) ABSTRACT

A vehicle support structure including: a main body portion (2) for axially supporting an axle rotatably; and a vehicle part attachment portion (3) extended from the main body portion. The vehicle part attachment portion has a first boss portion (4), a second boss portion (5), and a third boss portion (6) placed in a triangular form when viewed in a direction along the axle, a first connection portion (7) connecting the first boss portion with the third boss portion, and a second connection portion (8) connecting the second boss portion with the third boss portion, and is a cast of aluminum or an aluminum alloy. The first and second connection portions are tilted in such a manner that center portions in a longitudinal direction are reduced in thickness. A sprue mark is formed on a side portion of the third boss portion on an opposite main body portion side.

5 Claims, 4 Drawing Sheets

(56) References Cited

FOREIGN PATENT DOCUMENTS

| JP | 2017-217970 | 12/2017 |
|----|-------------|---------|
| JP | 2018-203246 | 12/2018 |

\* cited by examiner

VEHICLE SUPPORT STRUCTURE AND METHOD FOR MANUFACTURING VEHICLE SUPPORT STRUCTURE

TECHNICAL FIELD

The present invention relates to a vehicle support structure that is attached to a vehicle side and suspends a vehicle body, and a method for manufacturing a vehicle support structure.

BACKGROUND ART

In the related art, a vehicle support structure has been known that has a structure in which a trailing arm is attached and fixed to an arm attachment portion by inserting bolts into screw holes formed in boss portions at two locations of the arm attachment portion (PTL 1: JP2010-242821A). Based on a vehicle, a vehicle support structure has been proposed in which a trailing arm is attached and fixed to boss portions at three locations.

CITATION LIST

Patent Literature

PTL 1: JP2010-242821A

SUMMARY OF INVENTION

Technical Problem

It has been studied to cast a vehicle support structure in aluminum or an aluminum alloy for reduction in weight. However, in a structure in which a vehicle part such as a trailing arm is attached and fixed to boss portions at three locations, there may be a problem that blowholes are generated when the boss portions are connected by straight-shaped connection portions.

Solution to Problem

The invention has been made in view of the above circumstances. An object of the invention is to provide a vehicle support structure that is cast in aluminum or an aluminum alloy and can achieve further reduction in weight while enhancing stiffness, and a method for manufacturing a vehicle support structure.

As an embodiment, the problem described above is solved by a solution as disclosed below.

A vehicle support structure according to the invention includes: a main body portion that axially supports an axle rotatably, and a vehicle part attachment portion that extends from the main body portion. The vehicle part attachment portion includes a first boss portion, a second boss portion, and a third boss portion that are placed in a triangular form when viewed from a direction along the axle, a first connection portion that connects the first boss portion with the third boss portion, and a second connection portion that connects the second boss portion with the third boss portion. The vehicle support structure is a cast of aluminum or an aluminum alloy, the first connection portion and the second connection portion are each gradually tilted in such a manner that center portions in a longitudinal direction are reduced in thickness, and a sprue mark is formed on a side portion of the third boss portion on an opposite main body portion side.

According to this configuration, a molten metal is poured from the side portion of the third boss portion on the opposite main body portion side, and an intermediate portion of each connection portion has the smallest thickness, so that generation of blowholes can be prevented, and reduction in weight is further achieved while stiffness is enhanced.

Preferably, the first connection portion and the second connection portion are each gradually tilted so as to be reduced in thickness in a direction perpendicular to a load input direction that is a direction in which the largest load is applied from a vehicle part attached to each of the boss portions. According to this configuration, each connection portion is formed so as to be reduced in thickness in the direction perpendicular to the load input direction of the vehicle part, reduction in weight is achieved and the connection portion in the load input direction is thick, so that the stiffness can be enhanced. Preferably, each of the first connection portion and the second connection portion has an H-shaped cross section perpendicular to the longitudinal direction. According to this configuration, the cross section perpendicular to the longitudinal direction has an H shape, so that the stiffness can be further enhanced.

Provided is a method for manufacturing a vehicle support structure according to the invention, the vehicle support structure including a main body portion that axially supports an axle rotatably and a vehicle part attachment portion that extends from the main body portion, in which the vehicle part attachment portion includes a first boss portion, a second boss portion, and a third boss portion that are placed in a triangular form when viewed from a direction along the axle, a first connection portion that connects the first boss portion with the third boss portion, and a second connection portion that connects the second boss portion with the third boss portion. The method for manufacturing a vehicle support structure includes: starting pouring molten metal of aluminum or an aluminum alloy into a molding mold, with a sprue at a lateral position and the main body portion in a horizontal state; and thereafter performing casting after the pouring of the molten metal is completed while the molding mold is tilted such that the sprue is located at an upper position. The molding mold has a cavity corresponding to each of the first connection portion and the second connection portion so as to be gradually tilted in such a manner that center portions in a longitudinal direction are reduced in thickness, and the sprue provided at a position corresponding to a side portion of the third boss portion on an opposite main body portion side.

According to this configuration, the cavity is provided such that the intermediate portion of the connection portion has the smallest thickness, the pouring of the molten metal is started from the sprue disposed on the side portion of the third boss portion on the opposite main body portion side, with the main body portion in the horizontal state, and thereafter, the casting is performed after the pouring of the molten metal is completed while the molding mold is tilted such that the sprue is located at the upper position. Therefore, reasonable casting is achieved such that generation of blowholes can be prevented, and reduction in weight can be further achieved while maintaining necessary stiffness.

Advantageous Effects of Invention

According to the disclosed vehicle support structure, in a cast of aluminum or an aluminum alloy, generation of blowholes can be prevented, and reduction in weight can be further achieved while stiffness is enhanced.

DESCRIPTION OF EMBODIMENTS

Figure 1:
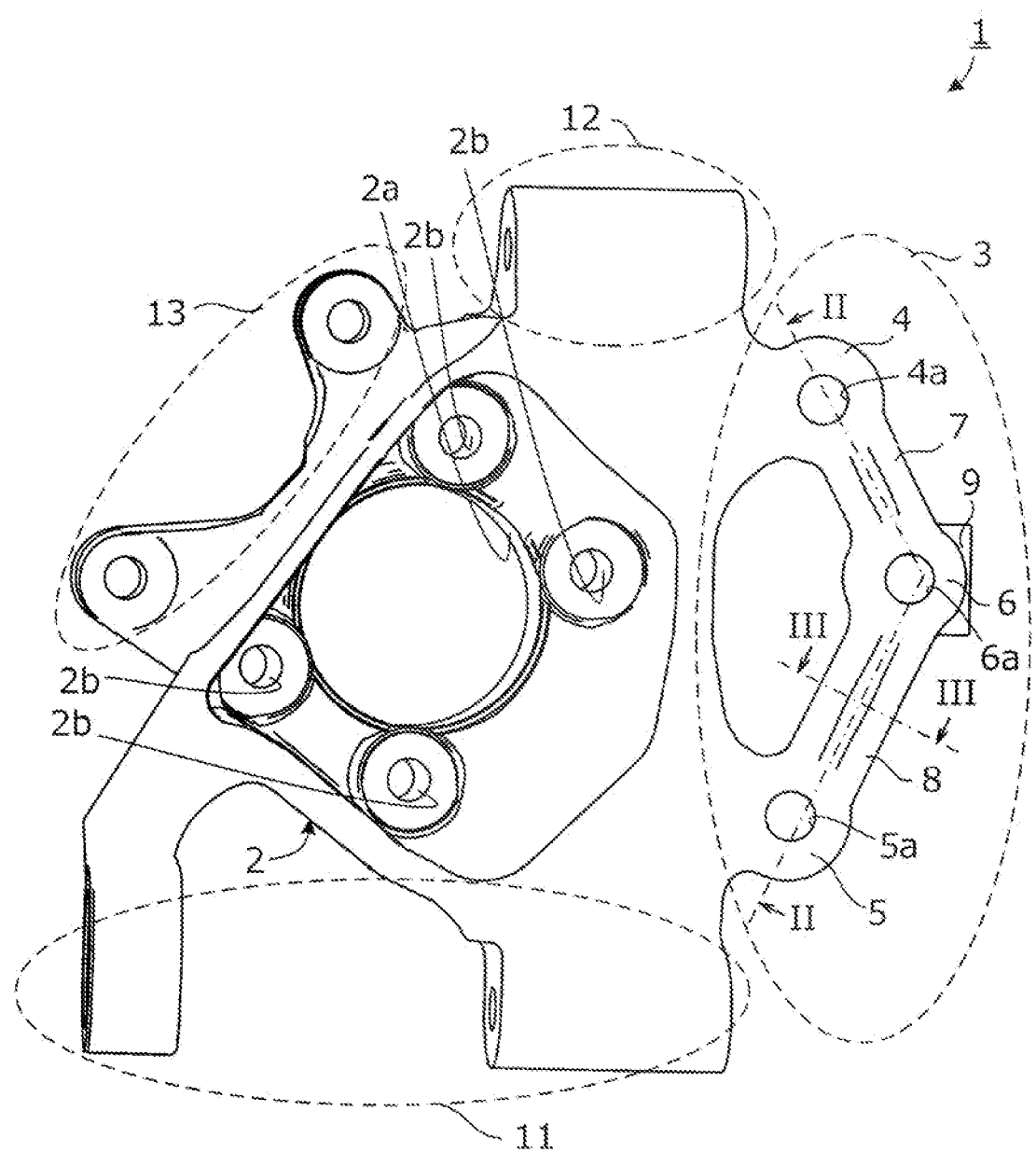
FIG. 1 is a schematic perspective view showing an example of a vehicle support structure according to an embodiment of the invention.

Hereinafter, an embodiment of the invention will be described in detail with reference to the drawings. FIG. 1 is a schematic perspective view showing an example of a vehicle support structure 1 according to the present embodiment. In all the drawings for describing the embodiment, components having the same function are denoted by the same reference numerals, and repeated descriptions thereof may be omitted.

As shown in FIG. 1, the vehicle support structure 1 according to the present embodiment is, as an example, a steering knuckle that supports both ends of a vehicle. The vehicle support structure 1 includes a main body portion 2 that axially supports an axle rotatably, and a vehicle part attachment portion 3 that extends from the main body portion 2. The vehicle part attachment portion 3 includes a first boss portion 4, a second boss portion 5, and a third boss portion 6 that are placed in a triangular form when viewed from a direction along the axle, a first connection portion 7 that connects the first boss portion 4 with the third boss portion 6, and a second connection portion 8 that connects the second boss portion 5 with the third boss portion 6. The vehicle part attachment portion 3 is a cast of aluminum or an aluminum alloy. A sprue mark 9 is formed on a side portion of the third boss portion 6 on an opposite main body portion side.

A shaft hole 2a through which the axle is inserted is formed in a center portion of the main body portion 2, and a plurality of through holes 2b for hub attachment are formed at predetermined intervals around the shaft hole 2a. In the example of FIG. 1, four through holes 2b are formed. Further, in FIG. 1, a lower arm connection portion 11 is formed on a lower side of the main body portion 2, an upper arm connection portion 12 is formed on an upper side of the main body portion 2, and a caliper connection portion 13 is formed on an obliquely upper side of the main body portion 2. The vehicle part attachment portion 3 extends on a side opposite to the side of the main body portion 2 on which the caliper connection portion 13 is formed.

Figure 2:
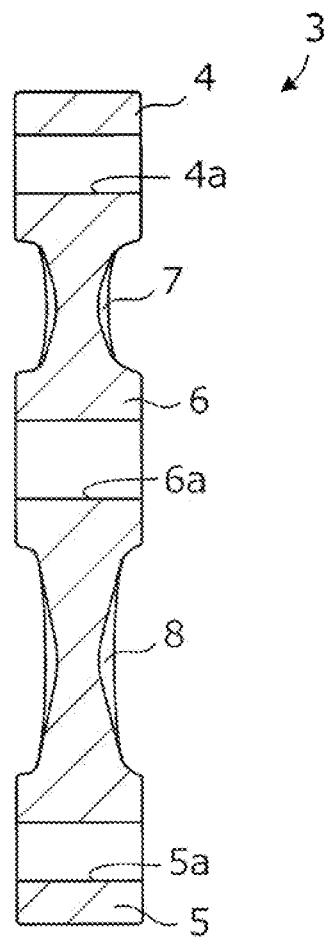
FIG. 2 is a cross-sectional view taken along a line II-II of FIG. 1.
Figure 3:
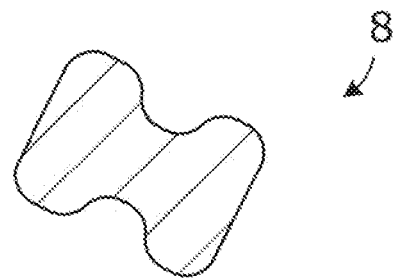
FIG. 3 is a cross-sectional view taken along a line III-III of FIG. 1.

FIG. 2 is a cross-sectional view taken along a line II-II of FIG. 1, and FIG. 3 is a cross-sectional view taken along a line III-III of FIG. 1. As shown in FIG. 2, the first connection portion 7 and the second connection portion 8 of the vehicle part attachment portion 3 are each gradually tilted in such a manner that center portions thereof in a longitudinal direction are reduced in thickness. Further, as shown in FIG. 3, the second connection portion 8 is gradually tilted in such a manner that the center portion in a lateral direction is reduced in thickness, and the same applies to the first connection portion 7. In the example of FIG. 3, the second connection portion 8 has an H-shaped cross section in the longitudinal direction, and the same applies to the first connection portion 7.

Figure 4:
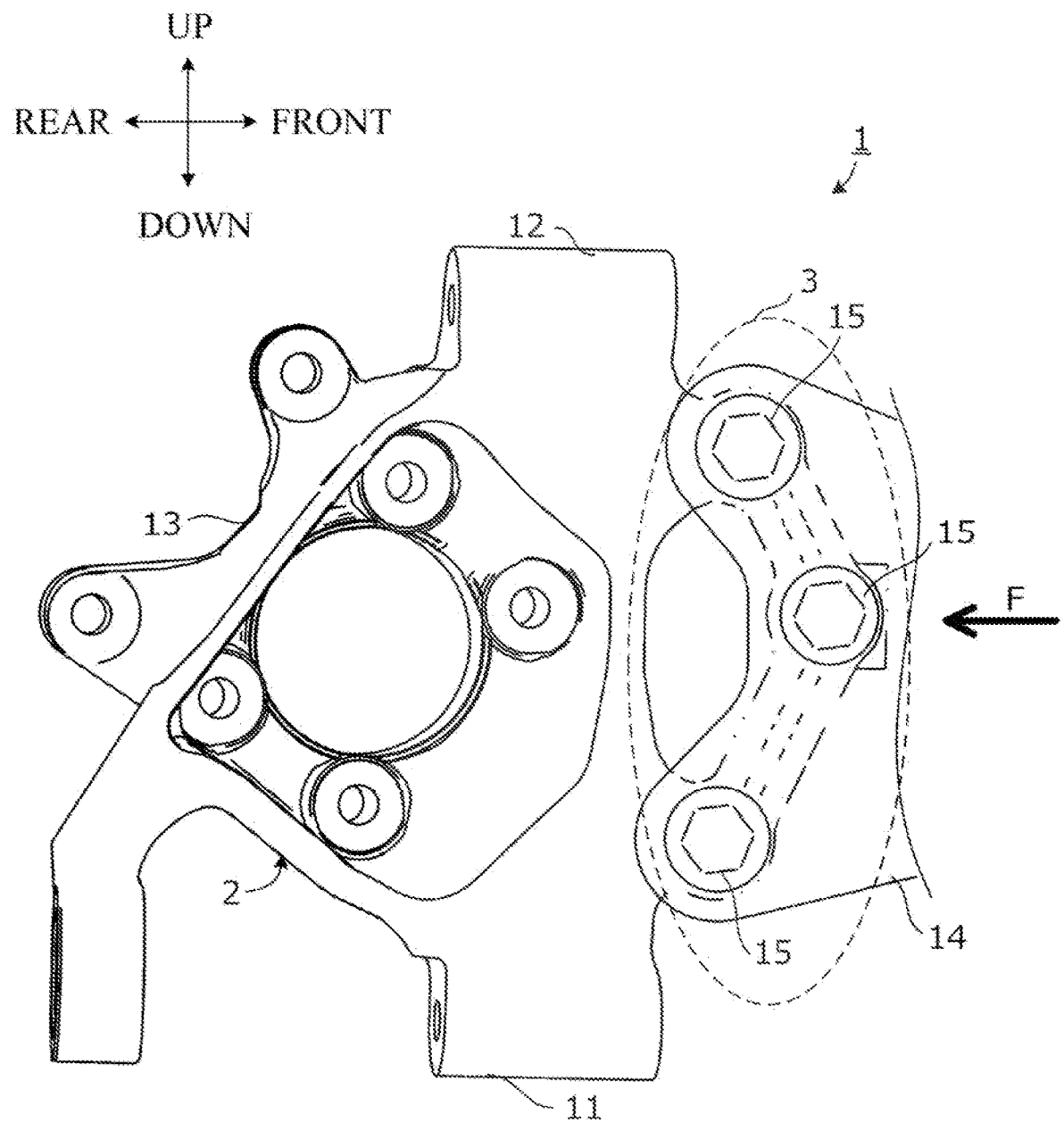
FIG. 4 is a schematic perspective view showing an example in which a trailing arm is attached and fixed to the vehicle support structure of FIG. 1.

FIG. 4 is a schematic perspective view showing an example in which a trailing arm 14 is attached and fixed to the vehicle support structure 1 of FIG. 1. Arrows in an upper-lower direction and arrows in a front-rear direction in FIG. 4 indicate upper-lower and front-rear positional relationships when the vehicle support structure 1 is attached to the vehicle. The trailing arm 14 is attached and fixed to the boss portions at three locations by fixing components 15 such as screws or bolts. According to the present embodiment, the first connection portion 7 and the second connection portion 8 are formed so as to be reduced in thickness in a direction perpendicular to a load input direction F of the trailing arm 14, reduction in weight is achieved and connection portions in the load input direction F are thick, so that stiffness can be enhanced. In addition, since each of the first connection portion 7 and the second connection portion 8 has the H-shaped cross section perpendicular to the longitudinal direction, the stiffness can be further enhanced. The load input direction F in FIG. 4 is indicated by an arrow from the front to the rear of the vehicle.

Figure 5A:
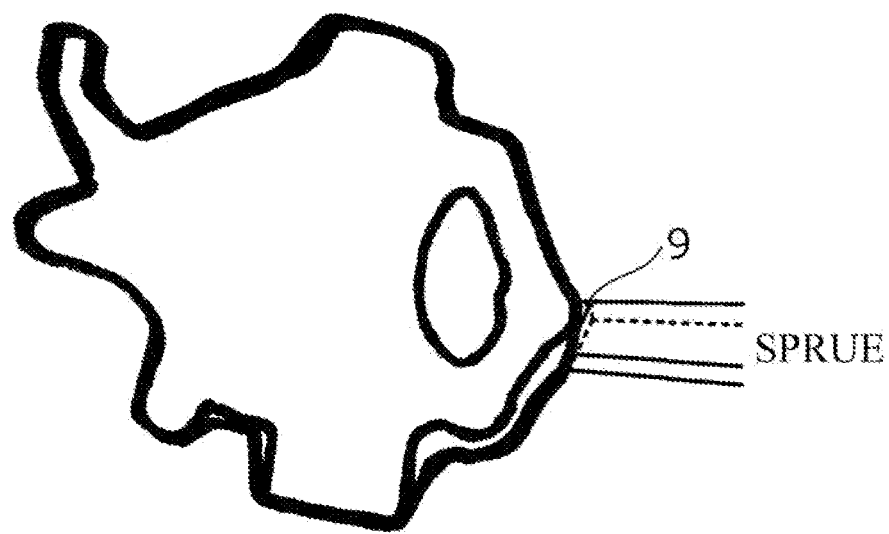
FIG. 5A is a schematic view showing an example of a pouring start state when casting is performed by a method for manufacturing a vehicle support structure according to the present embodiment.
Figure 5B:
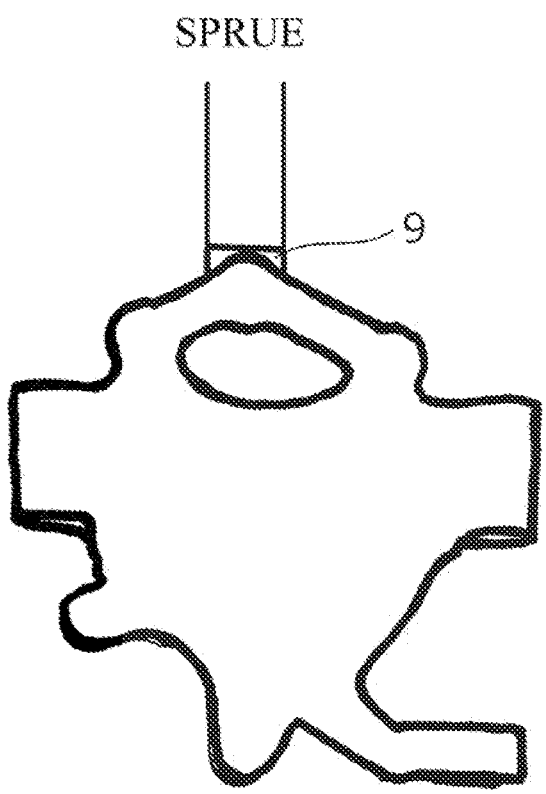
FIG. 5B is a schematic view showing an example of a pouring completion state after FIG. 5A.

In a method for manufacturing a vehicle support structure according to the present embodiment, as shown in FIG. 5A, molten metal of aluminum or an aluminum alloy is started to be poured into a molding mold, with a sprue at a lateral position and the main body portion in a horizontal state, and thereafter, as shown in FIG. 5B, casting is performed after the pouring of the molten metal is completed while the molding mold is tilted such that the sprue is located at an upper position, with the main body portion in a vertical state. The molding mold has a cavity corresponding to each of the first connection portion 7 and the second connection portion 8 so as to be gradually tilted in such a manner that center portions thereof in a longitudinal direction are reduced in thickness, and the sprue provided at a position corresponding to a side portion of the third boss portion 6 on an opposite main body portion side. This example is gravity casting. According to this configuration, the pouring of the molten metal is started from the sprue disposed on the side portion of the third boss portion on the opposite main body portion side, with the main body portion in the horizontal state, and thereafter, the casting is performed after the pouring of the molten metal is completed while the molding mold is tilted such that the sprue is located at the upper position. Therefore, the reasonable casting is achieved such that generation of blowholes can be prevented because of a spread of the molten metal over the cavity, and reduction in weight can be further achieved while maintaining necessary stiffness. The sprue is not limited to one location and may be provided at a plurality of locations. In addition, the invention is not limited to the gravity casting described above, and known casting techniques can be applied.

The invention is not limited to the embodiment described above, and various modifications can be made without departing from the scope of the invention.

What is claimed is:

1. A vehicle support structure comprising:
   a main body portion that axially supports an axle rotatably; and a vehicle part attachment portion that extends from the main body portion, the vehicle part attachment portion including a first boss portion, a second boss portion, and a third boss portion that are placed in a triangular form when viewed from a direction along the axle, a first connection portion that connects the first boss portion with the third boss portion, and a second connection portion that connects the second boss portion with the third boss portion, wherein the vehicle support structure is a cast of aluminum or an aluminum alloy, the first connection portion and the second connection portion are each gradually tilted in such a manner that center portions thereof in a longitudinal direction are reduced in thickness, and a sprue mark is formed on a side portion of the third boss portion on an opposite main body portion side.

2. The vehicle support structure according to claim 1, wherein the first connection portion and the second connection portion are each gradually tilted so as to be reduced in thickness in a direction perpendicular to a load input direction of a vehicle part attached to each of the boss portions.

3. The vehicle support structure according to claim 2, wherein each of the first connection portion and the second connection portion has an H-shaped cross section perpendicular to the longitudinal direction.

4. The vehicle support structure according to claim 1, wherein each of the first connection portion and the second connection portion has an H-shaped cross section perpendicular to the longitudinal direction.

5. A method for manufacturing a vehicle support structure, the vehicle support structure including a main body portion that axially supports an axle rotatably and a vehicle part attachment portion that extends from the main body portion, in which the vehicle part attachment portion includes a first boss portion, a second boss portion, and a third boss portion that are placed in a triangular form when viewed from a direction along the axle, a first connection portion that connects the first boss portion with the third boss portion, and a second connection portion that connects the second boss portion with the third boss portion, the method for manufacturing a vehicle support structure comprising:

starting pouring molten metal of aluminum or an aluminum alloy into a molding mold, with a sprue at a lateral position and the main body portion in a horizontal state; and thereafter performing casting after the pouring of the molten metal is completed while the molding mold is tilted such that the sprue is located at an upper position, the molding mold having a cavity corresponding to each of the first connection portion and the second connection portion so as to be gradually tilted in such a manner that center portions thereof in a longitudinal direction are reduced in thickness, and the sprue provided at a position corresponding to a side portion of the third boss portion on an opposite main body portion side.

* * * * *